LINE-ILLUMINATING APPARATUS AND METHOD FOR TELEVISION

Filed Sept. 27, 1966

INVENTOR.
Robert H. Clayton,
BY Hood, Gust & Irish
Attorneys.

United States Patent Office 3,495,036

Patented Feb. 10, 1970

3,495,036

LINE-ILLUMINATING APPARATUS AND METHOD FOR TELEVISION

Robert H. Clayton, Fort Wayne, Ind., assignor to International Telephone and Telegraph Corporation, Nutley, N.J., a corporation of Delaware Filed Sept. 27, 1966, Ser. No. 582,396
Int. Cl. H04n *3/00, 5/38;* H01j *29/89*
U.S. Cl. 178—7.6 4 Claims

ABSTRACT OF THE DISCLOSURE

Light from an elongated light source is directed through a lens which focuses the light onto a scene to be televised to provide high intensity illumination of incremental areas. Means are provided to scan the light source over the scene to illuminate successive line increments. The lens also receives and focuses the scanned image which passes through the light directing means in the return path onto a light sensing means.

The present invention relates to a line-illuminating apparatus and method for television, and more particularly to an apparatus and method for illuminating a scene being televised in a manner in which average scene illuminations may be reduced over that conventionally required.

In the televising of scenes, it is conventional to project onto the scene steady, continuous illumination of sufficiently high level to be picked up by the usual television camera tubes. Certain types of camera tubes require more illumination than others, the image dissector requiring a great deal higher level of illumination than the image orthicon, for example. Certain disadvantages inhere in the use of high level illumination which include the fatiguing of the camera tube cathode, discomfort to live performers, substantial expense of illuminating equipment and the like. The present invention overcomes the problems of high level illumination by scanning the scene being televised with high intensity illumination limited to incremental areas thereof. By this means, average scene brightness may be reduced while still receiving good signal-to-noise ratios.

It is an object of this invention to provide an apparatus and method for reducing average scene illumination required for operation of television camera tubes with good signal-to-noise ratios.

It is another object of this invention to provide an apparatus and method for illuminating a scene to be televised by scanning thereover a line of light corresponding to the size and shape of a scan line on a conventional cathode ray camera tube, and projecting onto the sensitive surface of such a camera tube the instantaneous image of that line portion of the scene being televised.

In the accomplishment of these objects there is provided an apparatus and method for illuminating a televised scene comprising a light source of elongated straight-line shape, and means for imaging said source onto a scene to be televised to illuminate only a straight-line increment thereof. There is also provided means for scanning this image light over the scene in a rectilinear direction transverse to the line increment thereby illuminating the entire scene in successive line increments. Means are provided for focusing images of the line increments of the scene as they are illuminated into a line of focus which may be made to coincide with the sensitive cathode of a conventional camera tube.

Figure 1:
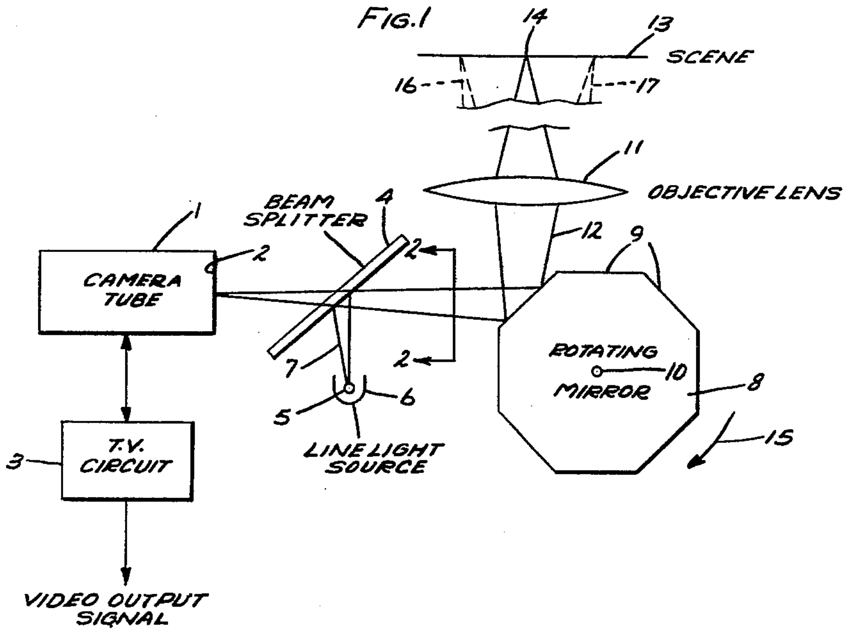
Figure 2:
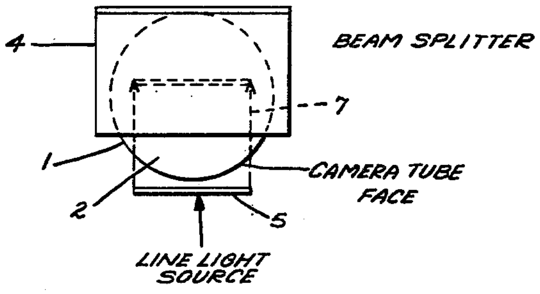

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a diagrammatic illustration in side view of an embodiment of this invention; and FIG. 2 is a view taken substantially along section line 2—2 of FIG. 1.

Referring to the drawings, a conventional camera tube 1 having an ordinary, image-receiving light-sensitive element or cathode 2 has connected thereto the usual television circuits 3 by which an optical image focused on sensitive element 2 may be converted into a conventional video signal.

Disposed in the optical path of the camera tube 1 is a conventional beam splitter 4 in the form of a half-silvered mirror or transparent sheet of highly reflective glass set at an angle of about 45° with respect to said axis.

A source 5 of light which may be in the form of an elongated light bulb of small diameter is positioned beneath the beam splitter 4 as shown. A parabolic or the like reflector 6 is disposed behind the light bulb 5 so as to project onto the beam splitter 4 in the position shown a very narrow, slightly divergent beam of light, indicated by numeral 7. It is important that the shape of the beam 7 projected onto the beam splitter 4 be elongated and narrow and resembling the size and shape of a scan line in the television tube 1. A rotating body or member 8 has on the periphery thereof a reflective surface composed of a plurality of flat mirrors 9 joined together in a hexagonal pattern when viewed from the side. These mirrors 9 are parallel to the axis 10 of rotation and are disposed to lie in the path of the light from source 5 which is reflected from the beam splitter 4.

An ordinary projecting lens 11 is disposed in the path of the light reflected from the mirrors 9, this light being indicated by the divergent beam 12. The lens 11 is so selected as to image the source 5 in straight-line form onto a scene 13 being televised, the focused character of this image being indicated by numeral 14. From the description that later follows, it will appear obvious that lens 11 may alternatively be positioned between the beam splitter 4 and the mirror 8.

This image 14 is of straight, elongated shape, very narrow in width and otherwise corresponding to a scan-line of the camera tube 1. Thus, the light image 14 may be said to correspond to a line increment of the scene 13 being televised. Such a line increment illuminated by the image 14 may be focused rearwardly by means of the lens 11 and mirror segments 9 onto the cathode 2 of the camera tube 1. As shown, the rearward projection passes through the beam splitter 4 and is focused on the cathode 2.

If it is assumed that the positions of the light source 5, the beam splitter 4, the camera tube 1, the lens 11 and the scene 13 are fixed, but that the rotary mirror 8 is revolving in the direction of the arrow 15, it will be noted that the line-like image 14 may be moved or scanned over the scene 13 between opposite limits 16 and 17 as determined by the sizes and the instantaneous angular positions of the mirror 9. If it is assumed that the line of light focused onto the mirrors 9 extends parallel to the axis 10, the direction of the scanning of the light image 14 across the scene 13 will be in a direction at right angles to the line. As each mirror section 9 passes through the light beam reflected from the beam splitter 4, the line image 14 will be scanned once over the scene 13 from the one limit 16 to the opposite limit 17. By rotating the mirrors 9 rapidly enough, the scene 13 may be illuminated such that to the eye it will appear that the scene is being illuminated from a large area source.

As each line increment of the scene 13 is illuminated, the line image of the scene so illuminated is projected rearwardly instantaneously onto the light-sensitive or cathode surface 2 of the camera tube. Inasmuch as the position of the rotating mirror 8 is fixed relative to the beam splitter 4 and the light source 5, the returning scene increments will fall on the same line-like area of the sensitive surface 2. By scanning this line area on the sensitive surface 2 conventionally with the use of horizontal scan elements and circuits only, the line image may be converted into a video output signal. It is important that the scanning of the cathode ray beam inside the camera tube 1 be in a direction parallel to the line image projected onto the surface 2 and furthermore that it coincide therewith. Thus, the light image from the scene 13 projected onto the surface 2 corresponds in size and shape precisely to the signal commutation area inside the tube 1.

In developing the video signal, the scanning circuitry and parts normally responsible for vertical scanning are omitted, the horizontal scanning parts only being used.

If the mirror 8 is rotated at a velocity at which the scene 13 is scanned by the light image 14 sixty (60) times a second, this will conform to the normal, commercial television scanning rates such that the video output signal from the circuits 3 may be utilized by the conventional, commercial television systems.

As will now be appreciated, instantaneous scene brightness may be greater than average scene brightness by a factor approaching the number of scan lines, or five hundred twenty-five (525) for the ordinary television scanning. This scanning rate may be so rapid, the human eye will not discern any flicker. Through the use of the principle of the beam splitter 4, illumination of the scene 13 may be said to be coaxial with respect to the viewing axis of the camera tube 1. This obviously eliminates parallax and objectionable shadow effects.

While the present invention has been disclosed in connection with the use of a rotating mirror 8 having six sides, it will appear as obvious to a person skilled in the art that vibrating mirrors and the like for moving the light image over the scene may be used without departing from the spirit and scope of this invention. In many applications, relative motion between the scene and the camera system by physically moving the camera system in a scanning sense over the scene can be substituted for the rotating mirror.

While there have been described above the principles of this invention in connection with specific apparatus, it is to be clearly understood that this description is made only by way of example and not as a limitation to the scope of the invention.

What is claimed is:

1. Apparatus for illuminating a televised scene comprising a light source of elongated straight-line shaped, means for directing light from said source onto a scene to be televised, focusing means interposed between said light directing means and said scene to focus said light source onto said scene to illuminate only a straight line increment thereof and also to receive and focus images of illuminated line increments of said scene in a return light path, means for scanning the imaged light over said scene in a rectilinear direction transverse to said line increment thereby illuminating the entire scene in successive line increments, and light sensing means disposed in said return light path to receive said focused images of the line increments of said scene, said light directed means being disposed in said return path between said focusing means and light sensing means to direct said focused scene images onto said light sensing means.

2. The apparatus of claim 1 wherein said light directing means includes a beam splitter set at an angle to an optical axis, and means for projecting said source onto said beam splitter at an angle at which it is reflected coaxially with respect to said optical axis.

3. The apparatus of claim 2 including within said scanning means a reflective surface interposed in said optical path and extending at an angle thereto, and means for continuously varying the position of said surface in a direction to change the size of the last-mentioned angle progressively between minimum and maximum values whereby said imaged light will be scanned over said scene.

4. The apparatus of claim 3 in which said reflective surface is carried by a rotatable member in the periphery thereof, said surface including a plurality of flat mirror sections joined edge-to-edge in a symmetrical arrangement about the axis of rotation of said member, said mirror sections extending parallel to said axis of rotation, said focusing means including an objective lens interposed in the path of the light reflected from said sections to image said source onto said scene and also to receive images of the illuminated line increments of said scene, said light sensing means including a television camera tube interposed in the return light path from said mirror sections for receiving the focused line images of said scene.

References Cited

UNITED STATES PATENTS

| | | | |
|---|---|---|---|
| 2,335,180 | 11/1943 | Goldsmith | 178—7.88 |
| 2,254,624 | 9/1941 | Rinia | 178—7.6 |
| 2,792,448 | 5/1957 | Deuth et al. | 178—7.6 |
| 3,280,692 | 10/1966 | Milnes et al. | |
| 3,294,903 | 12/1966 | Goldmark et al. | |

JOHN W. CALDWELL, Primary Examiner
BARRY L. LEIBOWITZ, Assistant Examiner

U.S. Cl. X.R.

178—7.2, 1.88